No. 836,982. PATENTED NOV. 27, 1906.
G. MACLOSKIE.
EMERGENCY BRAKE.
APPLICATION FILED MAR. 21, 1903. RENEWED MAR. 7, 1906.
2 SHEETS—SHEET 1.
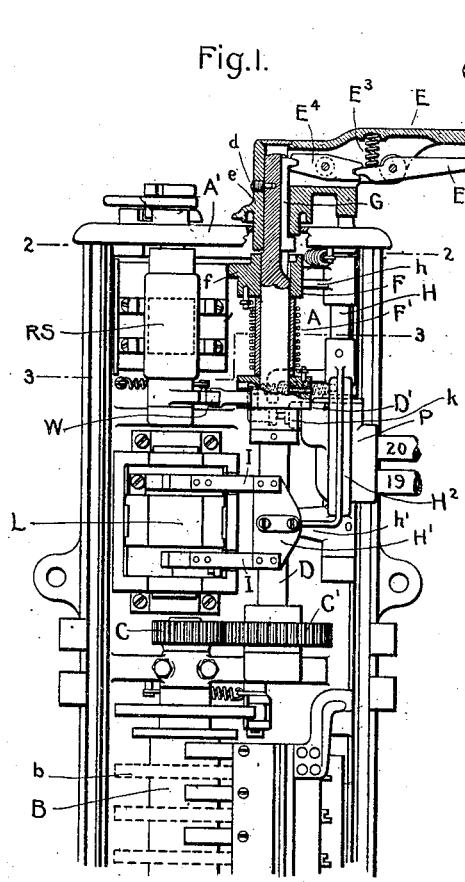
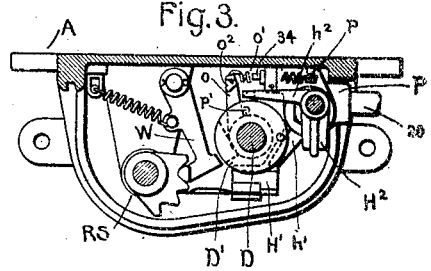
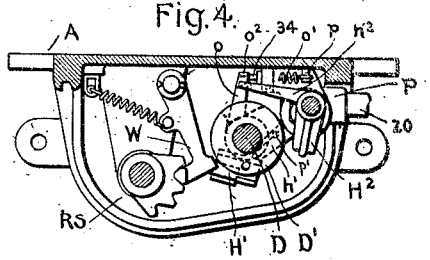
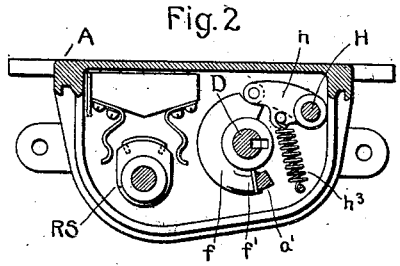
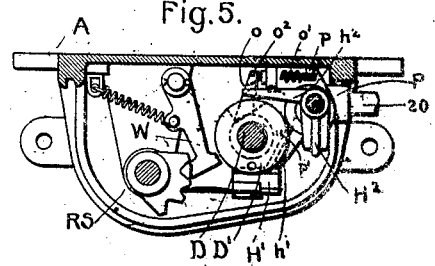
Witnesses.
J. Ellis Glenn.
Green Oxford
Inventor
George Macloskie
by Allen B. D—
Atty.

No. 836,982.  
PATENTED NOV. 27, 1906.  
G. MACLOSKIE.  
EMERGENCY BRAKE.  
APPLICATION FILED MAR. 21, 1903. RENEWED MAR. 7, 1906.

2 SHEETS—SHEET 2.

Witnesses.  
J. Ellis Glenn  
Helen Oxford

Inventor.  
George Macloskie.  
by Allen H. G. Dan  
Atty.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

EMERGENCY-BRAKE.

No. 836,982.  Specification of Letters Patent.  Patented Nov. 27, 1906.

Application filed March 21, 1903. Renewed March 7, 1906. Serial No. 304,778.

*To all whom it may concern:*

Be it known that I, GEORGE MACLOSKIE, a citizen of the United States, residing at Schenectady, county of Schenectady, State of New York, have invented certain new and useful Improvements in Emergency-Brakes, of which the following is a specification.

My invention relates to improvements in means for automatically controlling motors and power-actuated brakes in case of an emergency, and is intended for use especially in connection with electrically-propelled vehicles or trains employing a braking system actuated by compressed fluid.

It has heretofore been proposed to provide controllers with emergency-brake apparatus including a valve which is normally held closed against the tension of a spring and the pressure in the system by means of mechanism associated with the controller. In this prior arrangement when a comparatively large volume of air is to be exhausted, requiring a large opening in the emergency-valve, considerable power is necessary to keep the valve closed.

The object of the present invention is to provide means whereby the main-valve opening in the emergency apparatus may be given any desired area, while at the same time the power which must be spent in the controller for effecting the proper operation of the valve is relatively small. I accomplish this end by providing a normally closed relay-valve, which controls the operation of the brakes, together with a small normally closed controlling-valve, which when operated by the mechanism in the controller causes the relay-valve to operate to perform its intended function.

The present invention also comprises certain novel features of construction to be hereinafter described, and particularly pointed out in the claims.

Figure 6:
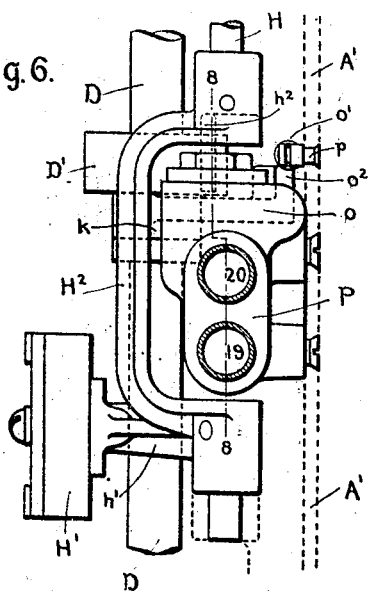
Figure 7:
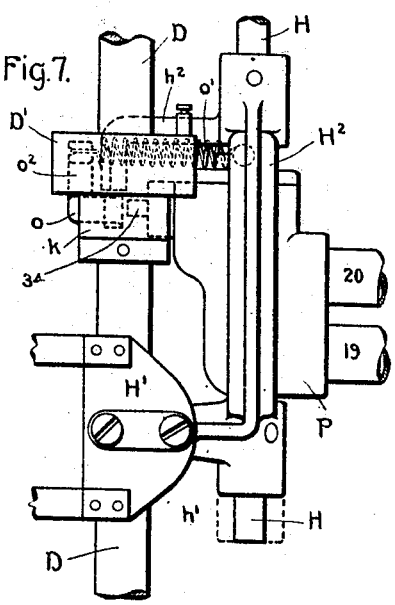
Figure 8:
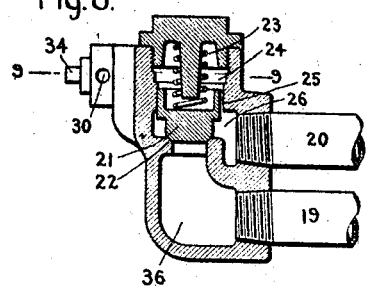
Figure 9:
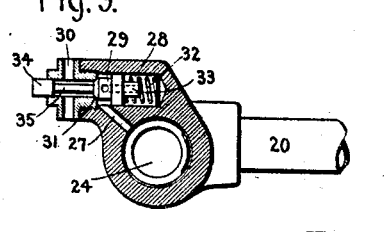
Figure 10:
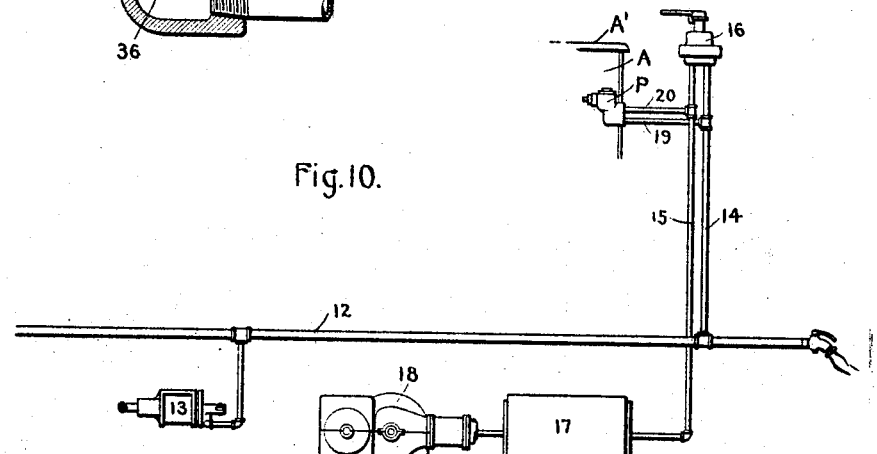

In the accompanying drawings, which illustrate the preferred embodiment of my invention, Figure 1 is a front elevation of a specific form of motor-controller embodying my invention, the casing-cover being removed and certain parts being shown broken away and in section. Fig. 2 is a sectional plan view on the line 2 2, Fig. 1. Figs. 3, 4, and 5 are sectional plan views on the line 3 3 of Fig. 1, showing the emergency-valve-operating mechanism in its different operative positions. Figs. 6 and 7 are respectively side and front elevations of the emergency-valve and the actuating mechanism therefor, on a larger scale. Fig. 8 is a section through the emergency-valve on the line 8 8 of Fig. 6. Fig. 9 is a section through the emergency-valve casing on the line 9 9, Fig. 8, and Fig. 10 is a diagrammatic representation of a "straight" air-brake system to which my invention is applied.

Referring now to the drawings, A represents the back of a motor-controller casing, and E the operating-handle for the controller-cylinder B within said casing. The controller-cylinder B carries the usual contact-segments $b$ and is geared by cog-wheels C C' to a shaft D, which runs up into the hub $e$ of the operating-handle E. The hub is rotatable in an opening in the cap-plate A' of the casing and is fastened to the shaft D by means of a set-screw $d$. Rotatably mounted on the shaft D is a sleeve F, maintained yieldingly in its normal position by a helical spring F', which is connected at one end to the sleeve and at the other end to the shaft, preferably by means of the collar D', secured to said shaft. The sleeve F carries a cam $f$ and lug $f'$, Fig. 2, the latter serving as a stop by abutting against a stationary lug $a'$ on the under side of the cap-plate.

Connected with the knob E' is a pin $e'$, which rests upon the long arm of the lever E², fulcrumed on the operating-handle E. A spring E³ bears on the short arm of the lever and keeps the pin and knob normally raised. A toothed rocker E⁴ also is fulcrumed on the operating-handle and engages with the short arm of the lever E². The other end of the rocker E⁴ engages with a lug on a bolt G, slidable in a keyway in the shaft D and adapted to enter a notch in the upper end of the sleeve F and lock said sleeve to the shaft. This will occur whenever the knob E' is depressed, providing the controller is in the "off" position. The sleeve F is adapted to be rotated with the shaft D so long as pressure is maintained on the broad knob E', on which the palm of the motorman's hand is adapted to rest while the controller-handle is being operated.

Adjacent to the shaft D within the controller is a rock-shaft H, carrying an arm $h$, which bears against the cam $f$, as shown in Fig. 2, whereby the movement of said cam will rock the shaft H. Mounted on the rock-shaft H is an arm $h'$, carrying a block of insulation H', on which are mounted two connected spring-contact fingers which coöperate with stationary contacts and form therewith a double-pole switch I for closing and opening the power-circuit when the shaft H is rocked.

RS represents the reversing-switch, W an interlocking device between said reversing-switch and the shaft D, and L indicates the insulating-casing containing the blow-out coil, or the switch I.

Mounted within the controller-casing and operatively connected in the air-brake system is an emergency-valve which is adapted to apply the brakes in case the controller-handle is released in any of its operative positions. To apply the brakes when the so-called "automatic" air-brake system is employed, the emergency-valve exhausts the train-pipe to atmosphere, and when the "straight" air-brake system is employed it connects the source of compressed-fluid supply to said train-pipe.

I have chosen to illustrate my invention in connection with the straight air-brake system, and, in Fig. 10, 12 indicates the train-pipe, which is connected to the brake-cylinder 13 and is also connected through the pipes 14 and 15 by way of the engineer's valve 16 and the storage-reservoir 17 to the source of compressed-fluid supply. (Here shown as a motor-driven air-compressor 18.) The emergency-valve casing P is connected to the pipes 14 and 15 by means of the pipes 19 and 20, respectively. The valve-casing P contains two valves, a relay-valve 21 and a controlling-valve 29. The valve 21 is adapted to control the communication between the pipe 20 and the pipe 19 or, in other words, to control the communication between the source of compressed-fluid supply and the train-pipe in the straight air system. (Shown in Fig. 10.) This valve is adapted to rest upon the valve-seat 22 and is normally maintained upon said seat by means of the compressed fluid from the source of fluid supply assisted by the spring 23. The compressed fluid enters the chamber 24 above the valve 21 from the chamber 26 through the small passage-way 25 in said valve 21.

Communicating with the chamber 24, by means of the passage-way 27, is an auxiliary-valve chamber 28, containing the valve 29, which controls the communication between the chamber 24 and the atmosphere through the exhaust-port 30. The said valve 29 is normally maintained on its seat 31 by means of fluid-pressure, assisted by the spring 32. The compressed fluid enters the chamber 28 behind the piston attached to the valve 29 through said passage-way 27 and the port 33 in the valve 29. Attached to the valve 29 is a spindle 34, having formed thereon an annular groove 35. When the spindle 34 is forced inwardly against the action of the spring 32 and the pressure of the fluid within the chamber 28, thereby raising the valve 29 from its seat, the chamber 24 is exhausted to atmosphere through the passage-way 27 and exhaust-port 30, and since the port or passage-way 25 in the valve 21 is small, compared with the exhaust-port 30, the pressure in the chamber 26 will open the said valve against the action of the spring 24 and connect the pipe 20 with the pipe 19 through the chambers 26 and 36. Such a construction allows a very small normally closed controlling-valve 28 to be used, which will require a comparatively small pressure on the spindle 34 to open it, and will control the operation of a relatively large relay-valve to allow the air-brake to be applied quickly.

The mechanism for operating the said controlling-valve will now be described. Loosely mounted on the shaft D is a collar $k$, carrying the arm $o$, to the outer end of which is fastened one end of a tension-spring $o'$, having its other end fastened to the pin $p$, mounted on the back A of the controller-casing. This arm $o$ is adapted to impinge the valve-spindle 34 and open valve 29, but is prevented from doing so by the arm $h^2$ during the time that the controller-handle is in any of its operative positions with the pin $e'$ depressed and the rock-shaft H rotated in such a manner as to close the cut-out switch I. The outer end of this arm $h^2$ is curved downward and is adapted to strike the projection $o^2$ on the outer end of the arm $o$, but is out of engagement with said projection when the controller-handle is in its off position or when the controller-handle is in any of its operative positions after the knob E' has been released by the operator. The face of the projection $o^2$, against which the downwardly-curved end of the arm $h^2$ strikes, is inclined, so as to allow said projection $o^2$ to slip by the end of said arm when released by said arm. The spring $o'$ is prevented from moving the arm $o$ into engagement with the spindle 34 when the controller-handle is in its off position by a pin $p'$. This pin $p'$ is carried on the under side of the collar D' and is shown in dotted lines, Fig. 3, in engagement with said arm. In order to obtain a neat and compact construction and in order to adapt this type of emergency-valve and the operating mechanism therefor especially to the specific form of controller herein shown and described, the rock-shaft H is bent around the valve-casing P at $H^2$.

In the operation of this controller and emergency-valve when the motorman places his hand upon the knob E' of the operating-handle E he depresses the push-pin $e'$ and forces the bolt G down into the notch in the sleeve F. The rotation of the handle operates first to close the cut-out switch I by operating the rock-shaft H through the agency of the sleeve F and the cam $f$ and then to control the motor-circuits by means of the cylinder B. With the controller-handle in its off position the emergency-valve-actuating mechanism is in the position shown in Fig. 3, the arm $o$ being maintained out of engagement with the valve-spindle 34 by means of the pin $p'$. As the controller-handle is moved forward through its operative positions with the knob E' depressed the sleeve F is moved forward, as is also the collar D' on the shaft D. This moves the pin $p'$ out of engagement with the arm $o$ and allows the said arm to move toward the valve-spindle 34. The arm $o$ is prevented from striking the valve-spindle, however, by the arm $h^2$, which in the operative positions of the controller-handle is moved into the path of the projection $o^2$ on the arm $o$. This position of the valve-actuating mechanism is shown in Fig. 4. If at any time the motorman removes his hand from the handle, the sleeve F is unlocked and the spring F' instantly turns the sleeve backward until the lug $f'$ strikes the stop $a'$ on the cap-plate. In this position of the sleeve the arm $h$ is out of engagement with the cam $f$ and the cut-out switch is thrown open by means of the spring $h^3$. Simultaneously with the operation of said switch, which is opened whenever the pressure is removed from the knob E', as above described, the arm $h^2$, carried by the rock-shaft H, is moved out of engagement with the projection $o^2$ and the end of the arm $o$ impinges the valve-spindle 34 through the action of the spring $o'$. The valve 29 is thus opened, thereby exhausting the compressed fluid from the chamber 24 and allowing the valve 21 to be opened by the pressure of the fluid in the chamber 26, as above described. This position of the valve-actuating mechanism is illustrated in Fig. 5. The brakes are now applied and the motor-circuit is broken. In order to release the brakes independent of the operation of the engineer's valve and to reset the emergency-valve-actuating mechanism, it is merely necessary to turn the controller-handle back to its initial or off position, thereby again bringing the pin $p'$ into engagement with the arm $o$ and restoring the said mechanism to the position shown in Fig. 3.

In the straight air system the source of compressed-fluid supply is normally disconnected from the train-pipe and the train-pipe is normally connected to atmosphere through a small exhaust-pot in the engineer's valve. Therefore when the air-brakes are applied by means of the operation of the emergency-valve a slight leaking will take place through said exhaust-port in the engineer's valve; but this leakage will not be sufficient to render the emergency-valve inoperative to apply the brakes.

The specific construction of the working parts of the motor-controller herein shown and described forms no part of my present invention and is not herein claimed, since it forms the subject-matter of a copending application of Frank E. Case, Serial No. 75,488, filed September 16, 1901. It is merely illustrated and described here to more clearly show how my invention may be applied to the type of controller generally employed as a master-controller in train-control systems.

It will be readily understood that the invention is not limited in its application to any specific form of motor-controller.

Although I have shown and described my invention in connection with a straight air-brake system—that is, a system in which the engineer's valve admits pressure directly from a storage-cylinder to the brake-cylinders through the train-pipe—it is evident that it will be applicable as well to an automatic system, in which case the emergency-valve will be arranged to discharge the train-pipe instead of to admit air from the storage-cylinder thereto.

It will also be understood that the controlling-handle from which the emergency-valve is operated is not necessarily the operating-handle of the motor-controller, as herein shown and described, but may be the operating-handle for the engineer's valve or any other handle adapted for the purpose.

I aim to cover in the claims hereto appended all modifications both of the system and of the apparatus herein disclosed which do not involve a departure from the spirit and scope of my invention.

What I claim as new, and desire to secure by Letters Patent of the United States, is—

1. In combination, a motor-controller, a handle for operating said controller, a brake actuated by fluid-pressure, a valve for controlling the operation of said brake, means independent of the mechanism operated by said controller-handle adapted to maintain said valve closed, and means adapted to open said valve when the controller-handle is released by the operator in any of its operative positions.

2. In combination, a motor-controller, a handle for operating said controller, a brake actuated by fluid-pressure, a valve for controlling the application of said brake, means independent of the mechanism operated by said controller-handle adapted to maintain said valve in its closed position, means for opening said valve when the controller-handle is released by the operator, and means for rendering said valve-opening means inoperative at the initial or "off" position of the controller.

3. In combination, a motor-circuit, a controller in said circuit, a handle for operating said controller, a power-actuated brake, a lve for controlling the application of said brake, means independent of the mechanism operated by said handle for maintaining said valve normally closed, and means controlled from said handle for opening the motor-circuit and for simultaneously opening the valve when the controller-handle is released by the operator in any of its operative positions.

4. In combination, a motor-circuit, a controller in said circuit, a handle for operating said controller, a power-actuated brake, a valve for controlling the application of said brake, means independent of the mechanism operated by said handle for maintaining said valve normally closed, means controlled from said handle for opening the motor-circuit and for simultaneously opening the valve when the controller-handle is released by the operator in any of its operative positions, and means for automatically rendering said valve-opening means inoperative at the initial or "off" position of the controller.

5. In combination, a brake actuated by fluid-pressure, a relay-valve adapted to control the application of said brake, a controlling-valve adapted to control the operation of said relay-valve, a controlling-handle, and means for operating said controlling-valve when the controlling-handle is released by the operator.

6. In combination, a brake actuated by fluid-pressure, a relay-valve adapted to control the application of said brake, a controlling-valve adapted to control the operation of said relay-valve, a controlling-handle, means for operating said controlling-valve when the said handle is released by the operator, and means for restoring said relay-valve to its normal position to allow said brakes to be released when the controlling-handle is moved into a predetermined position.

7. In combination, a controller having an operating-handle, a power-actuated brake, a relay adapted to control the operation of said brake, a controlling device for said relay, and means associated with said handle for causing the operation of said controlling device upon the release of the handle by the operator.

8. In combination, a controller having an operating-handle, a power-actuated brake, a relay adapted to control the operation of said brake, a controlling device for said relay, means associated with said handle for causing the operation of said controlling device in the brake-applying direction upon the release of the handle by the operator, and means associated with the controller for causing the operation of said controlling device in the brake-releasing direction upon the return of the controller to the "off" position.

9. In combination, a controller having an operating-handle, a fluid-pressure brake, a relay-valve adapted to control the application of said brake, a controlling-valve arranged to control the operation of said relay-valve, and means associated with said controller-handle and coöperating with said controlling-valve to cause the relay-valve to operate upon the release of said handle by the operator.

10. In combination, a controller having an operating-handle, a fluid-pressure brake, a controlling-valve arranged to control the operation of said relay-valve, means associated with said controller-handle and coöperating with said controller-valve to cause the relay-valve to operate to apply the brakes upon release of the controller-handle, and means associated with the controller and coöperating with said controlling-valve to cause the relay-valve to operate to release the brakes when the controller is returned to its "off" position.

11. In combination, a motor-controller, a handle for operating said controller, a power-actuated brake, a relay-valve for controlling the application of said brake, a normally closed controlling-valve for controlling the operation of said relay-valve, means for opening said controlling-valve, and means adapted to render said valve-opening means inoperative until the controller-handle has been released by the operator.

12. In combination, a motor-controller, a power-actuated brake, a relay-valve for controlling the application of said brake, a normally closed controlling-valve for controlling the operation of said relay-valve, means for opening said controlling-valve, a cut-out switch for opening the motor-circuit independent of the cylinder of said controller, and means for rendering said valve-opening means inoperative so long as the cut-out switch remains in its closed position.

13. In combination, a motor-controller, an operating-handle for said controller, a power-actuated brake, a relay-valve for controlling the application of said brake, a normally closed controlling-valve for controlling the operation of said relay-valve, means for opening said controlling-valve, a cut-out switch for opening the motor-circuit independent of the cylinder of said controller, and means for causing said cut-out switch and said valve-opening means to operate when the controller-handle is released by the operator in any of its operative positions.

14. In combination, a controller, a handle for operating said controller, a brake, a member for controlling the application of said brake, means independent of the mechanism operated by said controller-handle adapted to maintain said member in an inoperative position, and means adapted to move said member into its brake-applying position when the controller-handle is released by the operator in any of its operative positions.

15. In combination, a motor-controller, a handle for operating said controller, a brake, brake-controlling means comprising a member for controlling the application of said brake, means independent of the mechanism operated by said controller-handle adapted to maintain said member in its inoperative position, means for moving said member to its brake-applying position when the controller-handle is released by the operator, and means for rendering the brake-controlling means inoperative at the initial or "off" position of the controller.

16. In combination, a motor-circuit, a controller in said circuit, a handle for operating said controller, a power-actuated brake, a member for controlling the application of said brake, means independent of mechanism operated by said handle for maintaining said member in its inoperative position, and means controlled from said handle for opening the motor-circuit and for simultaneously moving said member to its brake-applying position when the controller-handle is released by the operator in any of its operative positions.

In witness whereof I have hereunto set my hand this 20th day of March, 1903.

GEORGE MACLOSKIE.

Witnesses:
BENJAMIN B. HULL,
HELEN ORFORD.